TAPE DRIVE FOR TELEPHONE ANSWERING DEVICE

Filed Feb. 14, 1969 5 Sheets-Sheet 1

James F. Cranor
Claude M. Faust
INVENTORS
BY Kolisch & Hartwell
Attys.

TAPE DRIVE FOR TELEPHONE ANSWERING DEVICE

Filed Feb. 14, 1969 5 Sheets-Sheet 2

James F. Cranor
Claude M. Faust
INVENTORS
BY Kolisch + Hartwell
Attys.

TAPE DRIVE FOR TELEPHONE ANSWERING DEVICE

Filed Feb. 14, 1969 5 Sheets-Sheet 3

James F. Cranor
Claude M. Faust
INVENTORS
BY Kolisch & Hartwell
Attys.

TAPE DRIVE FOR TELEPHONE ANSWERING DEVICE

James F. Cranor
Claude M. Faust
INVENTORS
BY
Kolisch + Hartwell
Attys.

TAPE DRIVE FOR TELEPHONE ANSWERING DEVICE

Filed Feb. 14, 1969 5 Sheets-Sheet 5

James F. Cranor
Claude M. Faust
INVENTORS
BY Kolisch + Hartwell
Attys.

United States Patent Office 3,606,345
Patented Sept. 20, 1971

3,606,345
TAPE DRIVE FOR TELEPHONE ANSWERING DEVICE

James F. Cranor, Milwaukie, and Claude M. Faust, Portland, Oreg., assignors to Ford Industries, Inc., Portland, Oreg.

Filed Feb. 14, 1969, Ser. No. 799,381
Int. Cl. G11b *5/00*
U.S. Cl. 274—4R 5 Claims

ABSTRACT OF THE DISCLOSURE

A telephone answering device, wherein tape support mechanism supports a magnetic tape for reversible movement past a recording and playback head, with drive for the mechanism supplied by a motor which is moved alternatively to two different positions drivingly engaging the mechanism to produce reversible operation thereof. The motor is moved to such different positions automatically by a toggle assembly which is driven by the motor through the tape support mechanism. The recording and playback head is mounted for shifting to different selected positions transversely of the tape, and mechanism is provided which automatically shifts the head at appropriate times.

This invention pertains to a telephone answering device, and more particularly, to apparatus in such a device for controlling relative movement between a tape and a recording and playback head.

A typical telephone answering device includes a pair of magnetic recording tapes. One tape is used to play out an announcement to a party whose call has been answered by the device, and the other is used thereafter to record any message which the calling party may wish to transmit. The tapes usually are supported separately for movement past separate recording and playback heads. Normally, the tapes are driven independently of one another by a common drive motor through separate idlers which are shifted selectively into and out of driving engagement with the drive shaft of the motor. The means provided in the past for controlling movement of the two tapes (through shifting the various idlers) has typically comprised complicated electrical circuitry, and an involved assembly of solenoids, relays and cam-operated switches distributed widely throughout the answering device.

This type of assembly has a number of drawbacks. The use of two tapes in the past, supported separately, adds to the complexity and cost of an answering device, and detracts from compactness. The involved nature of the means provided heretofore for controlling movement in tapes also adds to complexity and cost, and in addition, tends to detract from reliability.

A general object of the present invention, therefore, is to provide, in a telephone answering device, novel apparatus for controlling relative movement between a tape and a recording and playback head which avoids these drawbacks in a practical and satisfactory manner.

More specifically, an object of the invention is to provide such apparatus which is compact, and which is considerably less complicated and costly than apparatus previously available.

Another object of the invention is to provide a novel answering device which requires the use of a single recording tape only to handle both an outgoing announcement and an incoming message.

A related object is to provide a novel mounting for a recording and playback head which permits shifting of the head to different selected positions distributed generally transversely of the longitudinal axis of the tape, whereby the head is effective to record a message on and play it back from regions spaced laterally on the tape.

Still another object of the invention is to provide apparatus wherein a tape is supported for reversible movement past a recording and playback head on reversible support means, drive is supplied by a motor which is shiftable alternatively to two different positions drivingly engaging the support means, one position producing movement of the support means and tape in one direction, and the other position producing movement of the tape and support means in the opposite direction, and adjustment of the motor to such different positions is effected by mechanism driven by the motor through the tape support means.

With a construction having the features briefly summarized above, good compactness is attained, and complexity is minimized.

These and other objects and advantages attained by the invention will become more fully apparent as the description which follows is read in conjunction with the accompanying drawings, wherein.

Figures 1, 2:
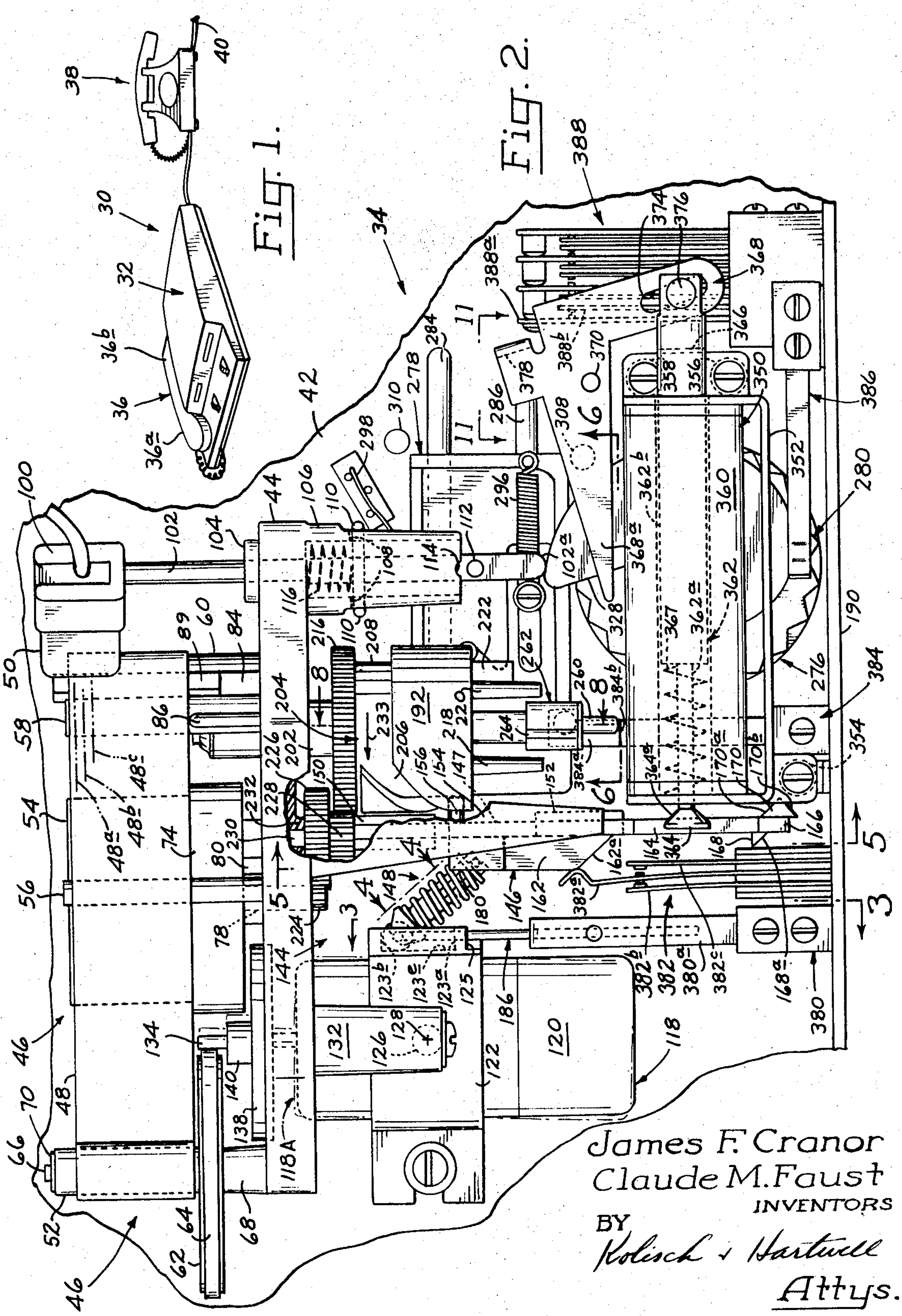
FIG. 1 is a simplified perspective view illustrating generally a connection between a telephone and a telephone answering device constructed according to the present invention.
FIG. 2 is an enlarged fragmentary top plan view illustrating apparatus included in the answering device of FIG. 1 for controlling relative movement between a tape and a recording and playback head as contemplated herein.
Figures 9, 10, 16, 17, 18, 19:
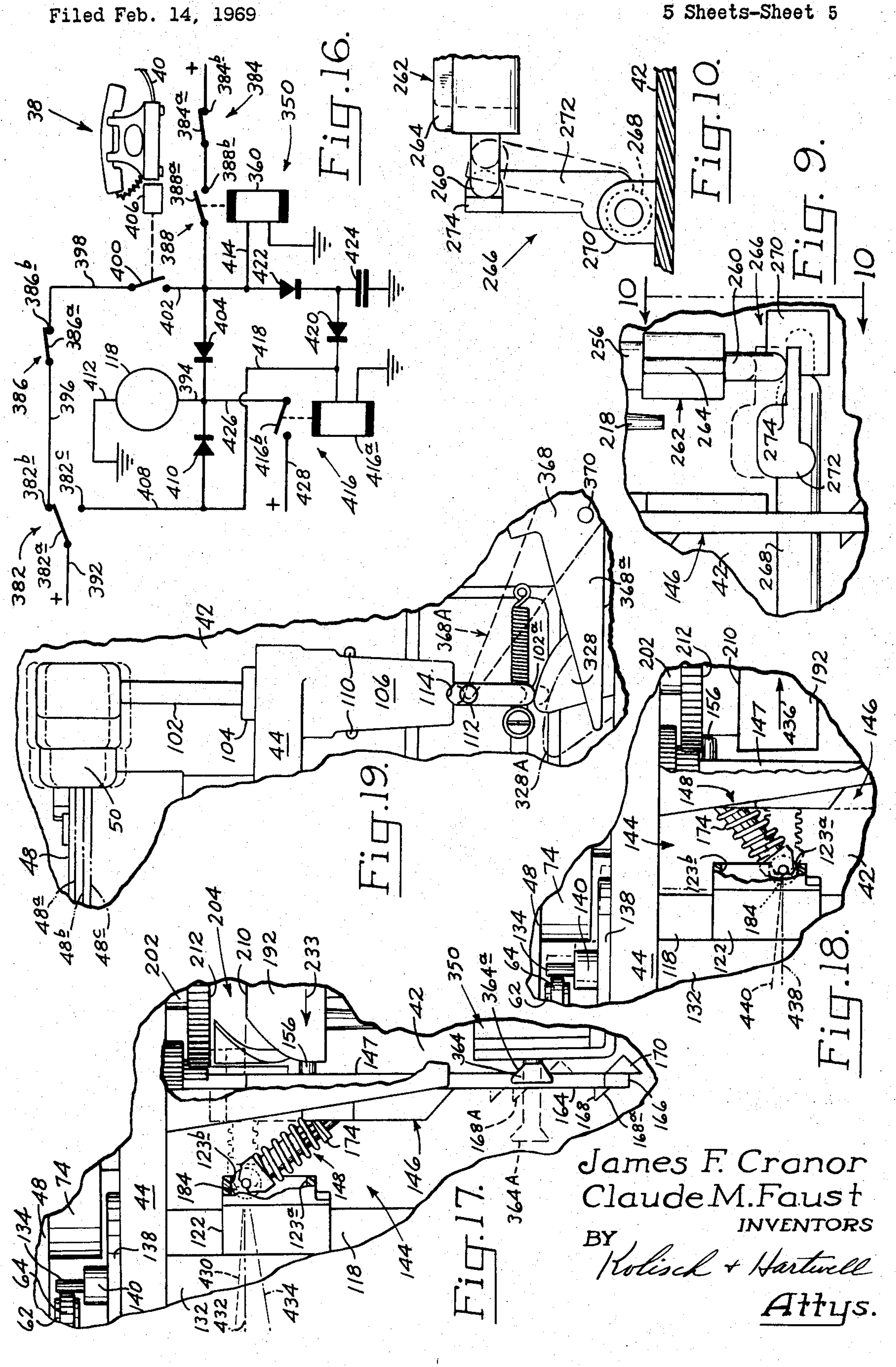
FIG. 9 is a simplified fragmentary top plan view, on a larger scale than FIG. 3, illustrating a portion of a clutch release mechanism employed in the apparatus of FIG. 2, but omitted from that figure in order to obtain better clarity therein.
FIG. 10 is a fragmentary side elevation taken along the line 10—10 in FIG. 9 illustrating how the clutch release mechanism may be employed.
FIG. 16 is a simplified diagram illustrating circuitry employed in the operation of a motor in the apparatus of FIG. 2.

FIGS. 17 and 18 are fragmentary top plan views, with certain parts removed, illustrating different positions that are occupied by parts in mechanism provided for adjusting the position of a drive motor in the apparatus of FIG. 2; and FIG. 19 is a fragmentary top plan view, with certain parts removed, illustrating different positions occupied by mechanism for shifting the position of a recording and pickup head in the apparatus of FIG. 2.

Turning now to the drawings, and referring first to FIGS. 1 and 2, indicated generally at 30 in FIG. 1 is a telephone answering device having a housing 32 containing, among other things, apparatus 34 (shown in FIG. 2) as contemplated herein for controlling relative movement between a tape and a recording and playback head. The answering device further includes a handset 36 (which is somewhat similar to the handset of a conventional telephone) held in a suitable support formed on the housing. The handset includes within it adjacent end 36*a* a microphone, and adjacent end 36*b* a speaker. Handset 36 may be employed by a subscriber using the answering device to record on a tape therein (which tape will be more fully described) an announcement which he wishes to have played out to a calling party, and further to listen to any incoming message which may have been recorded on the tape.

The answering device is connected to a conventional telephone set 38 which, in turn, is connected to the usual telephone line 40.

Figures 3, 15, 15A:
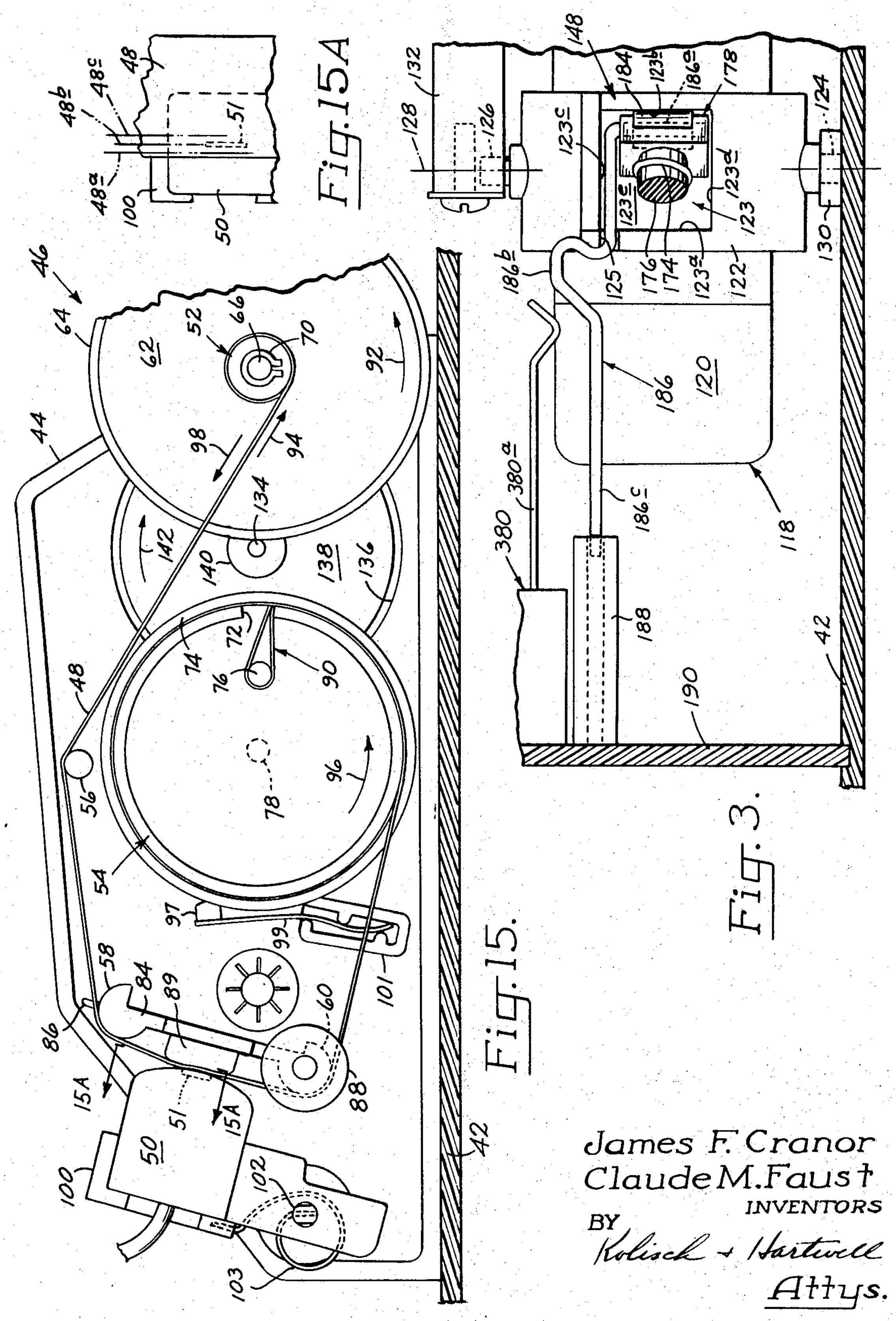
FIG. 3 is an enlarged fragmentary side elevation taken along the line 3—3 in FIG. 2.
FIG. 15 is a side elevation, on a larger scale than FIG. 2, further illustrating a recording tape, and tape support means employed in the apparatus of FIG. 2.
FIG. 15A is a fragmentary view taken along the line 15A—15A in FIG. 15.

Considering in detail the construction of apparatus 34, and referring now to FIGS. 2 and 15, the apparatus includes a planar deck 42 and a frame 44 suitably mounted on and extending upwardly at substantially a right angle to the deck. Deck 42 and frame 44 preferably are formed from plastic. Disposed on one side of frame 44 (the top side in FIG. 2) is means indicated generally at 46 supporting a magnetic recording tape 48 for reversible movement past a conventional recording and playback head, or means, 50. Support means 46 includes a pair of tape takeup drums 52, 54. Tape guides 56, 58, 60 are provided for guiding the tape between the drums.

Drum 52 has a considerably smaller outside diameter than drum 54, and is joined at one axial end to a drive wheel 62, the periphery of which supports a ring 64 of high friction material, such as rubber. Drum 52 and wheel 62 are journaled on a shaft 66, one end of which is fastened to the frame through a mount 68. Mount 68 preferably is formed integrally with the frame. A snap ring 70 retains drum 52 and wheel 62 on shaft 66.

Drum 54 takes the form of a hollow cylinder having an axially extending slot 72. The axial end of drum 54 which faces frame 44 is joined to a drive wheel 74 of slightly larger outside diameter. Extending axially into drum 54 from wheel 74 adjacent slot 72 is a pin 76. Joined to the axial end of wheel 74 which faces frame 44 is a shaft 78 which is journaled in a bearing 80 formed integrally with the frame.

Guide 56 takes the form of a pin formed integrally with and projecting laterally outwardly from frame 44. Guides 58, 60 also project outwardly from and are formed integrally with frame 44, and are joined by an integral web 84. A cushioning pad 89 is mounted as shown on web 84. Preferably, pad 89 is made of a material such as felt. Guide 58 has a projection 86 which inhibits lateral movement of the tape on the guide toward the frame. A cylindrical disc 88 fastened to the outer end of guide 60 prevents shifting of the tape off the outer end of the guide.

Tape 48 is a conventional magnetic recording tape, and in the embodiment of the invention shown has a transverse width of about ¾ of an inch. The surface of the tape having the usual magnetic coating faces outwardly of the drum 54 and the guides. One extremity of the tape is suitably secured to drum 52, and an expanse of the tape adjacent such extremity is wound on the drum in the fashion indicated in FIG. 15. The other extremity of the tape has a loop, indicated geneally at 90, which extends radially inwardly of drum 54 through slot 72 and is caught on pin 76. An expanse of the tape, progressing from the loop is wound on the outside of drum 54 as shown in FIG. 15. Between the drums the tape extends over the guides, and over pad 89.

With wheel 62 rotated in the direction of arrow 92 in FIG. 15, the tape moves in the direction of arrow 94, with the tape paying out from drum 54 and winding up on drum 52. Conversely, with wheel 74 rotated in the direction of arrow 96 in FIG. 15, the tape moves in the direction of arrow 98, with the tape paying out from drum 52 and winding up on drum 54. The direction indicated by arrow 94 is referred to herein as a forward direction for the tape, and the direction indicated by arrow 98 is referred to as a reverse, or rewind, direction.

A friction pad 97, biased by a spring 99, acts as shown in FIG. 15 against wheel 74. Spring 99 is supported in a mount 101 formed integrally with frame 44.

Recording and playback head 50 includes the usual recording and playback transducer 51 (see FIGS. 15, 15A) which engages the surface of tape 48 having the magnetic coating. As can be seen clearly in FIG. 15A, transducer 51 has a dimension measured transversely of the tape which is quite narrow in comparison with the width of the tape. Typically, this dimension might be about $^{20}\!/_{1000}$ of an inch.

As will be more fully explained, head 50 according to the invention is adapted to record on and play back messages from a plurality of adjacent regions, or tracks, distributed transversely of tape 48. With the tape and transducer shown herein, sixteen different tracks are employed on the tape, the positions of three of which are shown in FIGS. 2 and 15A generally by phantom lines 48*a*, 48*b*, 48*c*. Head 50 is shown in a position with transducer 51 engaging track 48*b*.

Head 50 is suitably secured to a holder 100 which is rotatably mounted adjacent one end of an elongated bar 102. An elongated spiral spring 103 having one end suitably anchored to bar 102 and the other end suitably anchored to holder 100 urges head 50 toward tape 48 and cushion 89.

Bar 102 extends slidably through a bearing 104 formed integrally with frame 44, and thence axially through an elongated guide tube 106 (which is also formed integrally with the frame) to a lower end 102*a* in FIG. 2. Extending outwardly from opposite sides of bar 102 through elongated guide slots 108 in tube 106 are arms 110. Joined to bar 102 adjacent the lower end thereof in FIG. 2 is a projection 112 (see also FIG. 6) which extends upwardly from the bar (out of the plane of the drawing in FIG. 2). Projection 112 is adapted to seat in a notch 114 to limit movement of the bar upwardly in FIG. 2. With projection 112 seated in notch 114, transducer 51 engages track 48*a* on the tape. A spring 116 disposed within tube 106 acts between frame 44 and arms 110 urging bar 102 and head 50 downwardly in FIG. 2. The arms prevent turning of the bar about its longitudinal axis.

Referring to FIGS. 2, 3 and 15, tape 48 and drum 52, 54 are driven by a unidirectional DC electric motor 118. The motor has a cylindrical housing 120 about which is clamped a generally cylindrical collar 122. The diametrically opposite sides of the collar (the top and bottom sides in FIG. 3) are provided with outwardly projecting axially aligned pins 124, 126. These pins accommodate mounting of the motor through the collar for rocking about an upright axis 128 (shown in FIGS. 2 and 3). Pin 124 is journaled in a bearing 130 suitably joined to the top of deck 42. Pin 126 is suitably journaled adjacent the outer end of a bracket 132 which extends outwardly from frame 44. In the embodiment shown, bracket 132 is formed integrally with the frame.

Formed on the side of the collar facing guide tube 106 is an elongated recessed pocket, or track, 123 which has a rectangular outline as viewed in FIG. 3. The track is defined by opposed end walls, or stops, 123*a*, 123*b*, top and bottom walls 123*c*, 123*d*, respectively, and a back wall 123*e*. An opening 125 is provided in end wall 123*a*.

Drive shaft 134 of the motor extends through a circular opening 136 (see FIG. 15) in the frame to a region intermediate wheels 62, 74. The drive shaft carries a flywheel 138, and outwardly of the flywheel a cylindrical drive member 140 made of a suitable high friction material, such as rubber. Flywheel 138 and member 140 rotate as a unit with shaft 134. With the motor operating, the drive shaft, flywheel and drive member rotate in the direction of arrow 142 in FIG. 15 in FIGS. 2 and 15, the motor is shown in solid outline in a position with the outer end of shaft 134 drivingly engaging ring 64. Through rocking of the motor about axis 128 to a position such as the one shown in dash-dot outline at 118A in FIG. 2, shaft 134 disengages from ring 64, and drive member 140 drivingly engages the periphery of drive wheel 74.

Further describing the apparatus of the invention, and referring to FIGS. 2 through 5, indicated generally at 144 in FIG. 2 is a toggle assembly. The toggle assembly functions, as will be more fully explained, as part of an actuating mechanism effective to shift motor 118 from one to the other of the two positions shown therefor in FIG. 2. The toggle assembly includes a slide member, or movable element, 146, and a bias mechanism 148.

Figures 4, 5, 6, 8, 11:
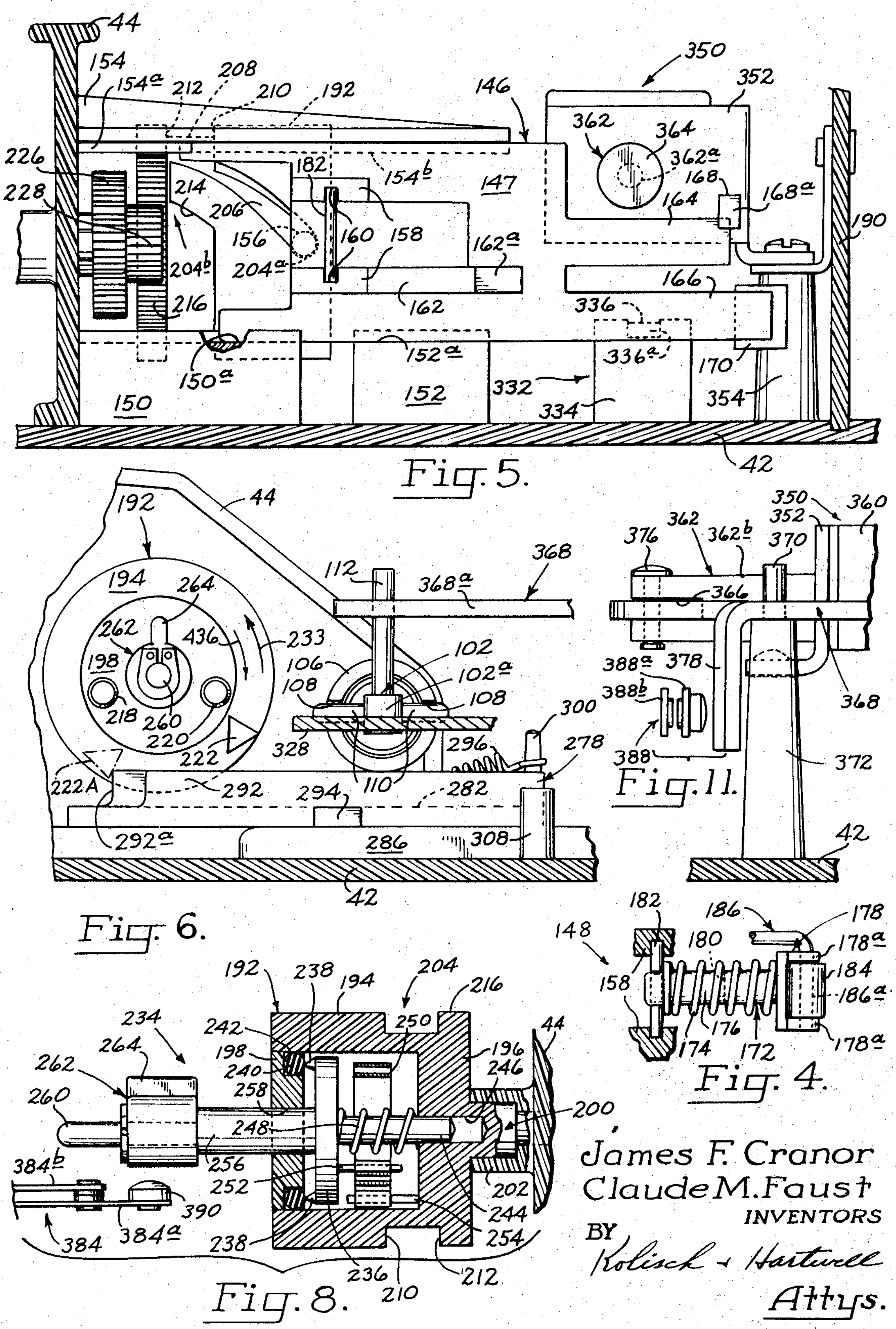
FIG. 4 is a fragmentary side elevation, on the same scale as FIG. 3, taken along the line 4—4 in FIG. 2.
FIG. 5 is a fragmentary side elevation, on the same scale as FIG. 3, taken along the line 5—5 in FIG. 2.
FIG. 6 is a fragmentary elevation, also on the same scale as FIG. 3, taken along the line 6—6 in FIG. 2.
FIG. 8 is a fragmentary cross-sectional view, on the same scale as FIG. 3, taken along the line 8—8 in FIG. 2.
FIG. 11 is a fragmentary elevation, on the same scale as FIG. 3, taken along the line 11—11 in FIG. 2.

Considering FIGS. 2 and 5, slide member 146 includes a body 147 slidably supported on guides 150, 152, 154. Projecting to the right of the body in FIG. 2 at the location shown is a pin, or projection, 156. Projecting to the left of the body in FIG. 2 are vertically spaced brackets 158 containing vertically aligned sockets 160. Also projecting to the left of the body is a cam 162. Cam 162 is provided with an upright planar cam face 162*a* which slopes downwardly and to the right as viewed in FIG. 2.

Also forming part of the slide are elongated vertically spaced fingers 164, 166 which extend to the right of body 147 in FIG. 5. Finger 164 is disposed above, and is somewhat shorter than, finger 166. Joined to the right end of finger 164 in FIG. 5, and on the left side of the finger in FIG. 2, is an upwardly projecting cam 168. Cam 168 includes an upright planar cam face 168*a* which slopes downwardly and to the right in FIG. 2. Joined to the right end of finger 166 in FIG. 5, and on the right side thereof in FIG. 2, is a cam 170. Cam 170 includes upright planar cam faces 170*a*, 170*b*. Face 170*a* slopes downwardly and to the right in FIG. 2, and face 170*b* slopes downwardly and to the left in FIG. 2.

Previously mentioned guides 150, 152 are suitably joined to and extend upwardly from deck 42. Guide 150 includes an elongated groove 150*a*, and guide 152 includes an elongated shoulder 152*a*, supporting the base of slide body 147. Guide 154 is formed integrally with frame 44, and includes ribs 154*a*, 154*b* supporting opposite sides of the top of body 147 in FIG. 5.

Bias mechanism 148 includes a member 172 and a spring 174. Referring for a moment to FIG. 4, member 172 includes an elongated shank 176 joined adjacent its right end in the figure to a bifurcated head 178 having opposed spaced-apart flanges 178*a*. Extending axially inwardly of the shank from the left end thereof in FIG. 4 is an elongated slot 180. Spring 174 surrounds shank 176.

Considering how the bias mechanism is mounted in place, the end thereof having slot 180 is mounted on slide member 146 through a pin 182. As can be seen clearly in FIG. 4, the pin extends through the slot, transversely of the axis of shank 176, with opposite ends of the pin seated in previously mentioned sockets 160. The other end of the bias mechanism is mounted through a roller, or rider, 184 for movement back and forth along wall 123*e* of track 123 in collar 122. The roller is positioned as shown between flanges 178*a* and is journaled on the downturned end portion 186*a* of an elongated slender bar 186. End portion 186*a* is pivotally supported on head 178 through suitable accommodating vertically aligned notches in flanges 178*a*. As can be seen in FIG. 3, progressing from end portion 186*a*, bar 186 extends outwardly of track 123 through opening 125, then curves to form a cam 186*b*, and thence extends substantially horizontally toward an end 186*c*. End 186*c* is slidably supported in a bearing 188 fastened to an upright plate 190 mounted on deck 42.

Spring 174 in the bias mechanism is somewhat compressed when mounted in place, and acts between pin 182 and head 178. Thus, the spring urges member 172 toward collar 122 and motor 118.

Referring to FIGS. 2 and 6 through 8, indicated generally at 192 is a timer drum as contemplated herein. The drum includes a hollow cylindrical wall 194 closed off adjacent the right axial end thereof in FIG. 8 by an integral end wall 196. The left axial end of wall 194 is closed off by a disc 198. The drum is journaled for rotation about its axis through shaft structure 200 (see FIG. 8) formed integrally with and extending axially outwardly from wall 196. The shaft structure is journaled in a bearing 202 formed integrally with frame 44.

Figure 7:
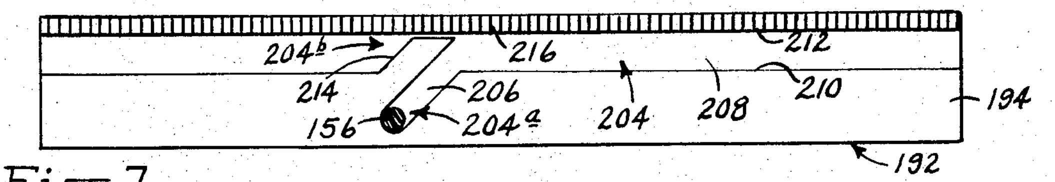
FIG. 7 is a developed view, on a smaller scale than FIG. 2, illustrating a groove formed on the outside of a timer drum in the apparatus of FIG. 2.

Referring particularly to FIGS. 2 and 7, formed on and extending circumferentially about the outside of wall 194 in the drum is an elongated groove 204. Opposite ends of groove 204, shown at 204*a*, 204*b* are spaced apart axially on the drum, with end 204*a* adjacent the lower axial end of the drum in FIGS. 2 and 7 and end 204*b* adjacent the upper axial end of the drum in the figures. Progressing along the groove from the end 204*a*, the groove includes an elongated portion 206 which is disposed at an angle to any radial plane passing through the drum, joining with an elongated portion 208 which occupies such a radial plane. Portion 206 has a transverse width which is just slightly greater than the diameter of previously mentioned pin 156. Portion 208, is defined by a pair of opposed walls, or wall expanses, 210, 212, and has a transverse width which is about twice the outside diameter of pin 156. Groove end 204*b* is defined by a wall 214 which extends in a fashion generally parallel to the longitudinal axis of groove portion 206.

Also formed on and extending circumferentially about the outside of drum wall 194 are gear teeth indicated generally at 216. Extending axially from the lower end of the drum in FIG. 2 are pins 218, 220 and a cam 222.

Drum 192 is drivingly connected to previously mentioned shaft 78 through gear teeth 216 and gears 224, 226, 228. Gear 224 is anchored to shaft 78 for rotation as a unit therewith. Gear 226 meshes with gear 224 and is fastened to a shaft 230 which is journaled in a bearing 232 formed integrally with frame 44. Gear 228 is joined coaxially with gear 226, and meshes with gear teeth 216.

With tape 48 driven in the direction of previously described arrow 94, drum 192 rotates in the direction of arrow 233 (see FIGS. 2 and 6). With the tape driven in the opposite direction, drum 192 rotates in the opposite direction.

Referring to FIGS. 6 and 8, indicated generally at 234 (FIG. 8) is a timer cam and clutch mechanism. Mechanism 234 includes a cylindrical clutch plate 236 disposed inside the drum, having teeth, such as teeth 238, distributed circumferentially about the margin of the left face of the plate in FIG. 8. The teeth are adapted to engage and bite into a soft annular ring 240 seated in an annular groove 242 defined by wall 194 and disc 198. Ring 240 is made of a material such as soft rubber.

Joined to and extending axially to the right of plate 236 in FIG. 8 is a shaft 244 which is slidably and rotatably received within a bore 246 extending into drum wall 196. A thrust spring 248 surrounds shaft 244 and is somewhat compressed between wall 196 and plate 236. Spring 248 urges plate 236 and teeth 238 toward ring 240.

Exerting a torque on clutch plate 236 is a spiral spring 250. One end of spring 250 acts on the clutch plate through a pin 252, and the other end of the spring acts on drum wall 196 through a pin 254. Spring 250 produces a bias on the clutch plate tending to rotate it relative to drum 192 in a counterclockwise direction viewing the plate along its axis from the left side in FIG. 8.

Joined to and extending axially to the left of the clutch plate in FIG. 8 is a shaft 256 which extends through a bore 258 in disc 198. Joined to the left end of shaft 256 in FIG. 8 is a shaft 260 of somewhat smaller outside diameter. Suitably anchored to shaft 260 inwardly of the left end thereof in FIG. 8 is a cylindrical timer cam element 262 having a radially outwardly projecting timer cam 264.

With the clutch plate occupying the position shown in FIG. 8, teeth 238 bite into ring 240 and inhibit relative angular movement between the clutch plate (and hence the timer cam element) and drum 192. With the clutch plate shifted axially to the right in FIG. 8 to disengage teeth 238 and ring 240, such relative angular movement is permitted. Previously described pins 218, 220 on drum 192 define the limits of such relative angular movement.

Referring to FIGS. 9 and 10 along with FIG. 8, clutch actuator mechanism is indicated generally at 266. Such mechanism has been omitted from other figures in order to obtain better clarity therein. Mechanism 266 includes an elongated shaft shown partially at 268 extending along and adjacent deck 42. The shaft is journaled for rotation about its longitudinal axis in bearings, such as bearing 270. Joined to and extending radially upwardly from the right end of shaft 268 in FIG. 9 is an arm 272. Formed on the outer end of arm 272 is a paddle 274 which is disposed adjacent the outer end of shaft 260.

With shaft 268 turned about its axis in a clockwise direction in FIG. 10, paddle 274 shifts to its dashed outline position, engages shaft 262, and shifts the clutch plate and teeth thereon free of ring 240. Turning of shaft 268 may be accomplished in any suitable manner.

Figure 12:
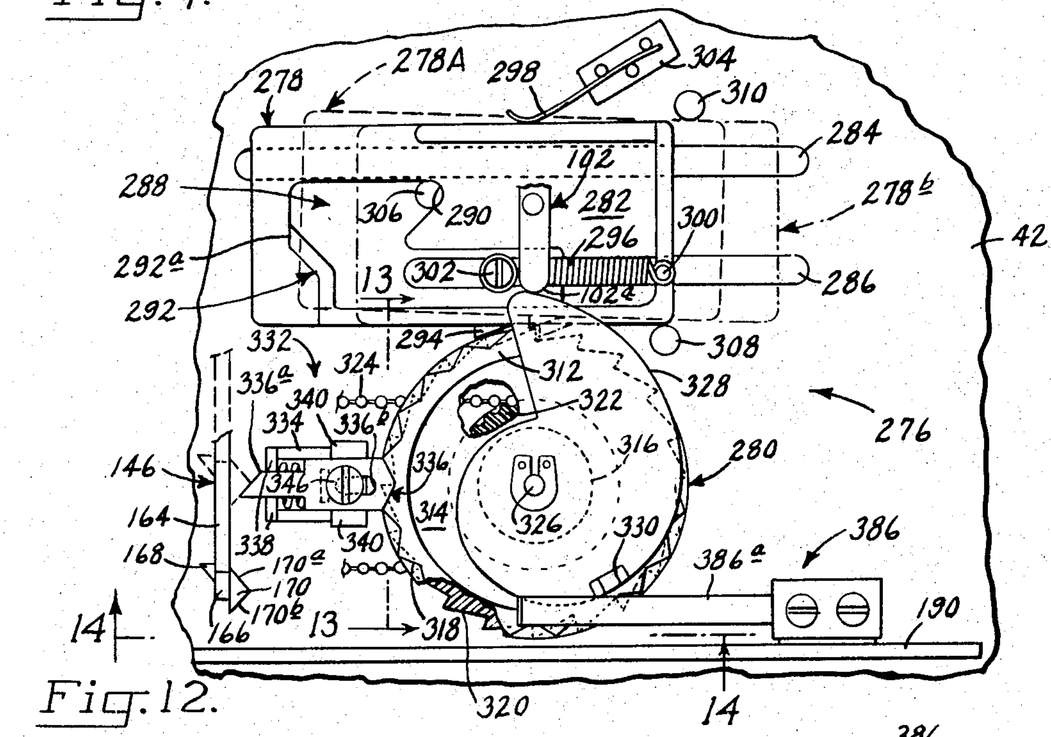
FIG. 12 is a fragmentary top plan view, on the same scale as FIG. 2, and with certain parts removed, illustrating in greater detail a pawl and ratchet wheel construction which is partially concealed in FIG. 2.
Figure 14:
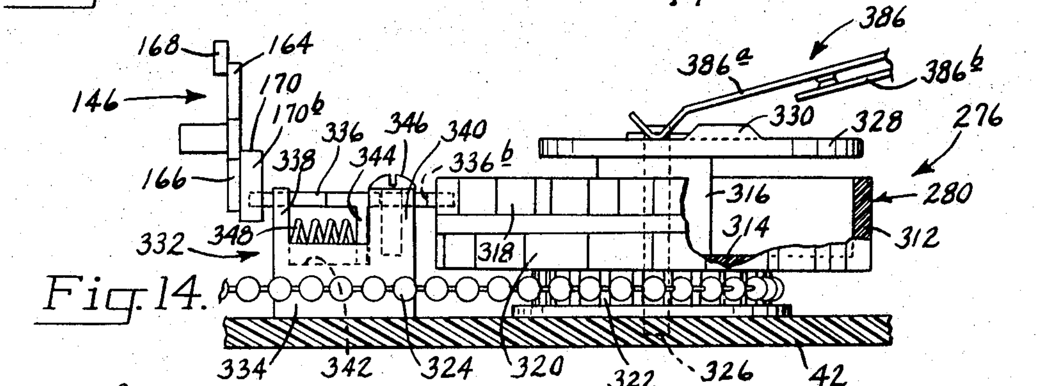
FIG. 14 is a fragmentary elevation, on the same scale as FIG. 13, taken along the line 14—14 in FIG. 12.
Figure 13:
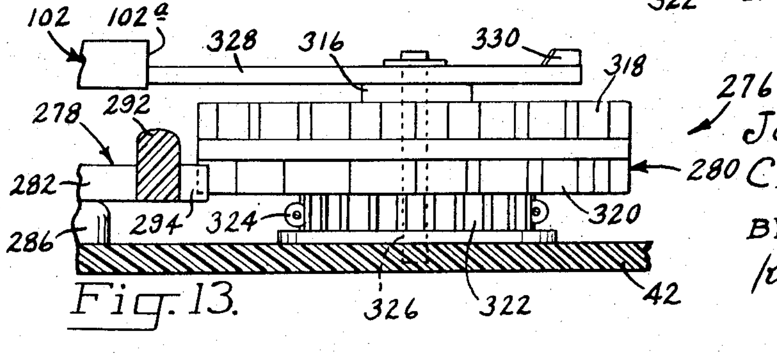
FIG. 13 is a fragmentary elevation, on a larger scale than FIG. 12, taken along the line 13—13 in FIG. 12.

Considering FIGS. 12 through 14, indicated generally at 276 is a ratchet wheel and pawl mechanism. Mechanism 276 includes a slide member 278 (see FIGS. 12 and 13) and a wheel 280.

Member 278 has a substantially flat base 282 supported for sliding back and forth (to the left and right in FIG. 12) on a pair of laterally spaced ribs 284, 286 which are formed integrally with an on the top side of deck 42. The base has a cut-away portion 288 (having the peripheral outline shown in FIG. 12) including a notch 290. Formed integrally with and extending upwardly from base 282 is a rim 292 (see also FIG. 6) having the outline shown in FIG. 12. Rim 292 includes an upright planar cam face **292*a* facing to the left in FIG. 12. Formed on the lower side of member 278 in FIG.12 (the right side thereof in FIG. 13) is a pawl 294**.

Slide member 278 is acted upon by springs 296, 298. Spring 296 is a coil spring having its right end in FIG. 12 anchored to the slide member through a pin 300, and its left end in FIG. 12 anchored to the top of rib 286 through a screw 302. Spring 296 is somewhat tensed, and tends to urge the the slide member to the left in FIG. 12. Spring 298 has one end mounted on deck 42 through a mount 304, and the other end pressing downwardly against the top side of the slide member in FIG. 12.

Upright guide pins 306, 308, 310 are provided on deck 42 for guiding the slide member. With the slide member in the position shown in FIG. 12, pin 306 engages the base of notch 290, and pin 308 engages the bottom side of the slide member.

Also, with the slide member occuping the position shown for it in solid outline in FIG. 12, cam face **292*a* is positioned to be engaged by previously described cam 222 on timer drum 192. More specifically, and referring for a moment to FIG. 6, cam 222 engages cam face 292*a* on rotation of the drum in the direction of arrow 233 an amount sufficient to shift the cam to its dash-dot outline position shown at 222A** in FIG. 6.

Wheel 280 has a somewhat cup-shaped configuration including a cylindrical wall 312 and a base 314 which is integral with the wall. Extending axially upwardly from the center of base 314, and formed integrally therewith, is a cylindrical post 316. Formed on the outside of the wall, and extending circumferentially thereabout, are two sets of teeth indicated generally at 318, 320. Teeth 318, also referred to herein as detent teeth, are formed adjacent the upper axial end of wall 312 in FIGS. 13 and 14, and have the peripheral outline shown in FIG. 12. Teeth 320, also referred to herein as ratchet teeth, are formed adjacent the lower axial end of the wall, and have the peripheral outline shown in FIG. 12.

Formed integrally on the bottom side of base 314 in FIGS. 13 and 14 is a drive drum 322. The outside of drum 322 is shaped to engage, drivingly, the balls in a ball chain shown partially at 324. Drum 322 and wheel 280 are journaled for rotation on an upright shaft 326 which is suitably fastened to deck 42.

Suitably anchored to the top of post 316 for rotation as a unit with wheel 280 is a cam 328 having the peripheral outline shown in FIG. 12. Formed on the top surface of cam 328 at the location shown is a cam 330. As can be seen clearly in FIGS. 12 and 13, the outside edge of cam 328 engages end **102*a* of bar 102**.

Chain 324 and drum 322 are provided to accommodate manual adjustment of the angular position of wheel 280 and cam 328 about shaft 326. The chain may be driven through any suitable form of manually operated mechanism provided in device 30.

Indicated generally at 332 in FIGS. 12 and 14 is a detent mechanism 332 including a base 334 anchored to deck 42 and a slide member 336 slidably mounted on the base. The base includes two pairs of upwardly projecting laterally spaced guide posts 338, 340 which guide opposite sides of slide member 336 adjacent the left and right ends thereof, respectively, in FIGS. 12 and 14. The base also includes a well 342 (see FIG. 14) freely receiving a downwardly projecting leg 344 formed integrally with slide member 336.

Referring particularly to FIG. 12, the right end of slide member 336 is shaped as shown to seat snugly between a pair of adjacent detent teeth on wheel 280. The left end of the slide member in FIG. 12 has an upright planar cam face **336*a* which slopes downwardly and to the left in the figure. The slide member further includes a slot 336*b* through which the member is mounted on base 334 through a screw 346**.

A spring 348 disposed within well 342 acts between the base and leg 344, and urges member 336 to the right in FIGS. 12 and 14.

Referring to FIG. 5, it will be noted that cam face **336*a* is at an elevation which is above the bottom of cam 170 and below the top of the cam. Further, it will be noted in FIG. 12 that the left end of member 336 extends somewhat to the left of the region in cam 170 where cam faces 170*a*, 170*b*** meet.

Considering now FIGS. 2 and 5, indicated generally at 350 is a solenoid mounted on deck 42 through a bracket 352 which is anchored to posts 354, 356, 358 formed integrally with the deck. The solenoid includes an elongated coil 360 and a relatively reciprocable plunger 362 having integral shank sections **362*a*, 362*b* of different outside diameters. Section 362*a* has a smaller diameter than section 362*b*. Opposite ends of the plunger protrude from axially opposite ends of the coil. Mounted on the left end of plunger section 362*a* in FIG. 2 is a head 364 having a conical surface 364*a* facing to the right in the figure. The right end of the plunger includes a slot 366 formed in section 362*b*. It will be noted that with plunger 362 occupying the position shown therefor in FIG. 2, head 364 is disposed to the right of previously described cam 168. It will be noted further in FIG. 5 that head 364 is disposed above the top surface of finger 164 in slide 146, and extends short distance below the top of cam 168. Shank section 362***a* of the plunger is also above the top of cam 168.

Solenoid 350 and detent mechanism 332 together constitute toggle actuator means herein for actuating toggle assembly 144.

Considering now FIGS. 2, 6 and 11, indicated at 368 is a crank having the configuration shown pivoted on a pin 370 which is supported on base 42 through a post 372 (see FIG. 11). The lower end of the crank in FIG. 2 is slidably received within slot 366 in plunger 362 and is provided with an elongated slot 374. A pin 376 prevents separation of the plunger and crank, while permitting a certain amount of relative pivotal and sliding motion between the two.

The crank includes a down-turned paddle 378. As can be seen clearly in FIG. 6, the left end of the crank, indicated at 368*a* in the figure, is disposed below the top of projection 112.

Suitably mounted on previously mentioned plate 190 are switches 380, 382, 384, 386, 388 which are positioned to be actuated by various parts in the mechanism described above.

Switch 380 (shown in FIGS. 2 and 3) includes an elongated arm 380*a* positioned to be engaged by cam 186*b* on movement of the latter to the left in FIG. 3.

Switch 382 (shown in FIG. 2) includes an elongated arm 382*a* and a pair of contacts 382*b*, 382*c*. Arm 382*a* is positioned to be engaged by cam 162 on slide member 146. With the cam in the position shown therefor in FIG. 2, it engages arm 382*a*, and holds the same against contact 382*b*. With cam 162 shifted upwardly in FIG. 2 clear of arm 382*a*, the arm separates from contact 382*b* and connects with contact 382*c*. Switch 382 constitutes a rewind limit switch herein.

Switch 384 (shown in FIGS. 2 and 8) includes an elongated arm 384*a* and a contact 384*b* normally engaged by the arm. The outer end of arm 384*a* carries a button 390 which is positioned to be engaged by timer cam 264 on rotation thereof with drum 192. Switch 384 is also referred to herein as an end-of-announcement switch.

Switch 386 (shown in FIGS. 2, 12 and 14) includes an elongated arm 386*a* which is normally closed upon a contact 386*b*. The left end of arm 386*a* in the figures is positioned to be engaged by cam 330. Switch 386 constitutes an end-of-tape capacity switch.

Switch 388 (shown in FIGS. 2 and 11) comprises a plurality of arms and contacts, including an elongated arm 388*a* and a contact 388*b*. Arm 388*a* is normally spaced from contact 388*b*. The arm is positioned to be engaged by paddle 378 of crank 368 on swinging of the crank in a clockwise direction in FIG. 2. On such swinging of the crank, the arm connects with contact 388*b*. The other arms in switch 388 are suitably ganged for movement with arm 388*a* whereby they make and break connections with contacts associated with them.

Considering now the circuit shown in FIG. 16, arm 382*a* of the rewind limit switch is connected through a conductor 392 to a suitable source of positive DC voltage. Contact 382*b* is connected to an electrical input terminal 394 for motor 118 through a circuit including a conductor 396, normally closed end-of-tape capacity switch 386, a conductor 398, a normally open switch 400, a conductor 402, and a diode 404. Switch 400 is suitably operatively connected to a conventional telephone ring detector unit indicated in block form at 406. Unit 406 is disposed adjacent previously mentioned telephone set 38, and closes switch 400 on ringing occurring at the telephone.

Contact 382*c* in the rewind limit switch is connected to terminal 394 through a circuit including a conductor 408 and a diode 410. The other electrical input terminal of the motor, shown at 412, is grounded.

Another circuit is provided through which positive DC voltage may be applied to conductor 402, such circuit including normally separate arm 388*a* and contact 388*b*, and normally closed end-of-announcement switch 384.

One side of solenoid coil 360 is connected through a conductor 414 to conductor 402, and the other side of the solenoid coil is grounded.

Indicated generally at 416 is a relay having a coil 416*a* and a normally open switch 416*b*. One side of coil 416*a* is grounded. The other side of the coil is connected to conductor 408 through a conductor 418, and to conductor 402 through a pair of diodes 420, 422. The junction between diodes 420, 422 is connected to ground through a capacitor 424. One side of switch 416*b* is connected to motor input terminal 394 through a conductor 426, and the other side of the switch is connected to the source of positive DC voltage through a conductor 428.

Explaining now how the apparatus described operates, prior to a call being received at telephone 38 the various movable parts in the apparatus, and the various switches therein, occupy the positions shown therefor in solid outline in FIGS. 2 and 16. An announcement is stored on track 48*a* on the tape, such having been recorded there by a procedure still to be described. Timer cam element 262 has an angular position relative to pins 218, 220 such as that shown in FIGS. 2 and 6. As will become more fully apparent, this position for element 262 is such that cam 264 thereon will engage button 390 on completion of playing out of the announcement. Transducer 51 in head 50 is initially positioned on track 48*b* on the tape, such positioning being determined by engagement of bar end 102*a* and cam 328.

On a call being received at telephone 38, the telephone rings in the usual fashion, and through the operation of ring-detector unit 406, switch 400 closes. When this occurs, current is supplied through conductors 392, 396, 398, 402 and switches 382, 386, 400 to motor 118, solenoid coil 360 and relay coil 416*a*. In addition, charging current is supplied capacitor 424.

Referring to FIGS. 2, 17 and 19, coil 360 energizes and shifts plunger 362 to the left in FIGS. 2 and 17 to the dashed outline position shown for the plunger in FIG. 17. Such action shifts plunger head 364 to the left of cam 168 in FIG. 17. In addition, such movement of the plunger causes crank 368 to rotate in a clockwise direction in FIG. 19 about pin 370 to the position shown in dashed outline at 368A. With such movement of the crank, the end 368*a* thereof engages projection 112, and shifts bar 102 and head 50 upwardly in FIG. 19 to their dashed outline positions. This shifts transducer 51 to a position on tape track 48*a*.

Such rotation of crank 368 also causes paddle 378 to actuate the various arms in switch 388 through engaging arm 388*a*. And with such action, arm 388*a* closes upon contact 388*b*. On this occurring, a redundant circuit is provided connecting motor 118 and coils 360, 416*a* to the supply of positive voltage, such circuit including arm 388*a*, contact 388*b*, arm 384*a* and contact 384*b*.

Actuation of other arms in switch 388 at this time may be employed in any one of a number of ways well known to those skilled in the art to stop the ringing in telephone 38, and to establish a conductive connection between head 50 and telephone line 40 whereby information can be transmitted from the former to the latter.

With ringing stopped, switch 400 opens.

With current supplied to coil 416*a*, the coil energizes and closes switch 416*b*. This results in the closing of another redundant power supply circuit for motor 118, such circuit including conductor 426, switch 416*b* and conductor 428.

With current supplied to motor 118, the same operates and (because of engagement of drive shaft 134 and ring 64) drives tape 48 forwardly from its starting position in the direction of arrow 94 in FIG. 15. With such movement of the tape, the announcement message recorded on tape track 48*a* may be played out to the calling party over the telephone line. Rotation of drum 54 with forward travel of the tape causes timer drum 192 to rotate in the direction of arrow 233 in FIGS. 2 and 6.

Referring to FIG. 17, such rotation of the timer drum causes pin 156 to ride in groove 204, with the result that the pin, slide member 146, and the right end of bias mechanism 148 shift upwardly in the figure. On the drum rotating an amount sufficient to place pin 156 on wall expanse 210 in the groove, the pin, slide and bias mechanism occupy the positions shown therefor in dashed outline in FIG. 17. With the parts in these dashed outline positions, the axis of bias mechanism 148 slopes slightly upwardly and to the left in the figure along a line coinciding with dashed line 430. Compression in spring 174, and engagement of pin 156 and wall expanse 210, are effective to hold the parts in such positions. In this condition, bias mechanism 148 is held just short of an over-center position wherein the axis of the bias mechanism would extend along a line coinciding with phantom line 432 in FIG. 17. A full showing of this over-center position is omitted in order to simplify the figure.

It will be noted that with slide member 146 in its dashed outline position, cam 168 occupies the dashed outline position shown for it at 168A in FIG. 17.

Movement of cam 170 past slide member 336 in the detent mechanism with such movement of slide member 146 is accommodated by cam face **170*a* and flexibility in finger 166. Clearance is provided between plunger shank portion 362*a* and the top of cam 168**.

With movement of slide member 146 in the manner just indicated, cam 162 disengages from arm **382*a* in the rewind limit switch. Arm 382*a* thereupon breaks connection with contact 382*b* and connects with contact 382*c***.

On completion of playing out of the announcement message, timer cam 264 engages button 390 on switch arm **384*a* and opens the switch. It should be noted that regardless of the position of the timer cam between pins 218, 220, the timer cam engages button 390 before cam 222 reaches cam face 292*a* on slide member 278. On switch 384 opening, solenoid coil 360 de-energizes, and spring 367 returns plunger 362 to the position which it initially had. With such return movement of the plunger, conical surface 364*a* on plunger head 364 strikes cam face 168*a* on cam 168. As a consequence, and referring to FIG. 17, slide member 146 shifts abruptly upwardly in the figure to its dash-dot outline position where pin 156 engages wall expanse 212 in groove 204. Such shifting of the slide causes bias mechanism 148 to move through the over-center position described above to a position with its longitudinal axis extending along a line coinciding with dash-dot line 434** in FIG. 17.

Return movement of the solenoid plunger also returns crank 368 to the position which it initially had. This results in arm **388*a* breaking connection with contact 388*b*. In addition, and through the action of spring 116, bar 102 returns to the position which it intially had. Head 50 returns to a position with transducer 51 on tape track 48*b***.

It will be appreciated by those skilled in the art that various arms and contacts in switch 388 (other than arm **388*a* and contact 388*b*) may be employed on de-energizing of solenoid coil 360 to establish a connection between the telephone line and head 50** permitting an incoming message to be recorded through the head on the tape. No specific circuits and connections are shown since such are conventional and form no part of the invention.

Considering now FIG. 18, with bias mechanism 148 thus moved through the over-center position described for it earlier, spring 174 expands and causes roller 184 to shift rapidly along track 123 into engagement with end wall **123*a*. This situation is illustrated in FIG. 18 where mechanism 148 is shown in solid outline. On this occurring, motor 118 rocks about axis 128 (see FIG. 2) to its dash-dot outline position in FIG. 18. Drive shaft 134 disengages from ring 64, and drive member 140 engages the outside of wheel 74. Power continues to be supplied the motor through conductors 426, 428, and switch 416*b*. As a consequence, the motor drives drum 54 in the direction of arrow 96** in FIG. 15 to rewind the tape to its starting position.

A further consequence of such shifting of roller 184 is that cam **186*b* in bar 186 engages arm 380*a* and actuates switch mechanism 380 (see FIG. 3). Actuation of switch mechanism 380** may be utilized in any one of a number of ways well known in the art to supply an audio tone over the telephone line to the calling party. Typically, the calling party is told during the announcement that such a tone will be heard, and that upon completion of the tone he may transmit any message which he may wish to leave for the called party.

Still referring to FIG. 18, with drum 54 driven by the motor as just described, timer drum 192 turns in the direction of arrow 436 (see also FIG. 6). Pin 156 on slide member 146 rides in groove 204, and is returned ultimately to the position which it initially had prior to a call being received at telephone 38. Such return movement of pin 156 and slide member 146 causes bias mechanism 148 to shift through another over-center position wherein its axis coincides with phantom line 438 in FIG. 18. A full showing of this second-mentioned over-center position is also omitted from the drawings in order to avoid undue complexity therein.

On traveling through this second over-center position, the bias mechanism shifts to a position with its axis coinciding with dashed line 440 in FIG. 18. Spring 174 then expands, and causes roller 184 to shift upwardly in FIG. 18 along track 123 to a position disposed against end wall **123*b*** in the track. The bias mechanism is thus returned to the same position which it initially had before a call was received.

With such action, motor 118 rocks again to the position which it initially had with its drive shaft drivingly engaging ring 64. The tape now moves again in a forward direction past head 50, with the latter recording on track **48*b* any message transmitted by the calling party. Power for the motor is initially supplied through switch 416*b*, such being held closed by coil 416*a* which is energized by discharge of capacitor 424. On cam 162 again disengaging arm 382*a***, power is supplied the motor through the rewind limit switch.

With forward movement of the tape, slide member 146 and bias mechanism 148 again shift to the positions shown for them in dashed outline in FIG. 17. Actuation of switch 384 by timer cam 264 has no effect during this forward movement of the tape. Considering FIGS. 6, 12 and 17 together, this situation remains until cam 222 on the end of the timer drum moves to its dash-dot outline position in FIG. 6 where it engages cam surface **292*a* on slide member 278. When this occurs, and with continued rotation of the timer drum, slide member 278 shifts to the right in FIG. 12 against the action of spring 296 through a dashed outline position 278A (where pawl 294 shifts past a ratchet tooth on wheel 280) to a position such as that shown in dash-dot outline at 278B. With continued rotation of the timer drum, cam 222 disengages from cam face 292*a*, and spring 296 quickly returns slide member 278** to the position which it initially had.

On return movement of slide member 278, pawl 294 strikes a ratchet tooth on wheel 280 and shifts the wheel one tooth-position in a counterclockwise direction in FIG. 12.

Such movement of wheel 280 causes slide member 336 in detent mechanism 332 to shift momentarily to the left in FIG. 12. Cam face **336*a* on member 336 strikes cam face 170*b* of cam 170, and through such action shifts slide member 146** upwardly to its dash-dot outline position in FIG. 17.

Thereupon, motor 118 rocks as previously described to a position with drive member 140 drivingly engaging wheel 74 to rewind the tape. At the completion of rewinding, the toggle assembly returns motor 118 in the manner previously described to the position which it initially had with its output shaft engaging ring 64. Cam 162 re-engages arm 382*a* in the rewind limit switch, breaking the connection between arm 382*a* and contact 382*b*. This breaks the redundant circuits supplying power to the motor, and hence the motor stops.

Referring briefly to FIG. 19, with shifting of wheel 280 one tooth-position as just described, cam 328 shifts counterclockwise in FIG. 19 to the dash-dot outline position shown therefore at 328A. Bar end 102*a* of bar 102 follows the outside edge of cam 328 through the action of spring 116. This results in head 50 being shifted transversely of the tape to a position with transducer 51 on tape track 48*c*.

Wall 214 is provided adjacent end 204*b* of groove 204 to insure that the motor is toggled to rewind the tape in the event of a failure in the operation of solenoid 350 or detent mechanism 332.

The operation just described for a single incoming call is repeated with successive incoming calls, with any incoming messages that are given during such successive call being recorded on successive, side-by-side adjacent tracks on tape 48. Should the tracks on the tape provided for storing incoming messages become completely filled, on completion of the last of such messages, cam 328 shifts to a position with cam 330 thereon engaging switch arm 386*a*. When this occurs, arm 386*a* breaks connection with contact 386*b*, whereupon no further incoming calls at telephone 38 are effective to operate the answering device.

Explaining briefly how an announcement may be placed on tape track 48*a*, suitable circuitry (not part of the invention) may be provided for energizing motor 118 independently of the circuitry shown in FIG. 16 and for establishing a connection between head 50 and the microphone in end 36*a* of handset 36. The clutch actuator, or release, mechanism may be operated through turning shaft 268 to shift clutch plate 236 away from ring 240, thus permitting relative rotation between timer cam element 262 and drum 192.

With forward movement of the tape, and resultant rotation of drum 192 in the direction of arrow 233, timer cam 264 engages button 390. However, spring 250 does not have sufficient force to urge the timer cam past the button, and as a consequence, cam 264 is held against the button while the timer drum continues to rotate.

With such forward movement of the tape, an announcement may be recordered thereon, and at the conclusion of the announcement, mechanism 266 may be actuated to return the clutch plate to a position with teeth 238 engaging ring 240. Thereupon, element 262 becomes locked for movement as a unit with the timer drum. The motor may be permitted to continue operating until it has been toggled automatically to rewind the tape, and then returned to its initial position. Thereupon, the motor may be stopped.

With such a procedure, it is apparent that recording of an announcement results in the angular disposition of the timer cam relative to the drum being related to the location of the end of a recorded announcement on tape 48. Pin 220 limits the amount of relative movement permitted between element 262 and drum 192 with the tape moving forward, and thus limits the maximum length of an announcement. The structure shown permits an announcement of slightly less than thirty seconds.

Through manual adjustment of chain 324 to rotate wheel 280 and cam 328, transducer 51 may be adjusted to engage different tracks on the tape to permit the subscriber using the answering device to listen to messages which have been recorded on such tracks. Suitable circuitry (not part of the invention) may be provided for operating motor 118 and connecting head 50 to the speaker in end 36*b* of handset 36 to permit playing out of such a message.

Cam 222 limits the maximum length of an incoming message which will be recorded. Slightly more than thirty seconds is provided for in the embodiment of the invention shown herein.

While a preferred embodiment of the invention has been described herein, it is appreciated that variations and modifications may be made without departing from the spirit of the invention.

It is claimed and desired to secure by Letters Patent:

1. In a telephone answering device having recording and playback means adapted to cooperate with an elongated magnetic tape, the combination in operative condition comprising reversibly movable tape support means supporting such a tape for reversible movement past said recording and playback means, said tape having a starting position relative to the recording and playback means, motor means for driving said support means, means mounting said motor means for movement adjacent said support means accommodating adjustment of the motor means alternately to two different positions drivingly engaging the support means, said motor means when operated in one of said positions driving the support means and tape in one direction, and when operated in the other position driving the support means and tape in the opposite direction, and adjusting mechanism driven by said motor means through said support means for automatically adjusting the position of the motor means to limit the movement of the tape support means and tape in said one and opposite directions, said adjusting mechanism including a drum drivingly connected to said tape support means and adapted to be rotated thereby about its axis, means defining an elongated radially outwardly facing groove extending circumferentially about the outside of said drum, with the groove having one end disposed at one axial location along the drum and another end disposed at a different axial location on the drum, and a movable element having a projection extending into said groove and adapted to ride therein with rotation of the drum to produce movement in said movable element, said movable element moving under the influence of said tape support means, with rotation of said drum, toward a first position effective to shift the motor means from its said one position to its said other position, with the support means and tape driven in said one direction, and moving under the influence of the tape support means, and with rotation of the drum, toward a second position effective to shift the motor means from its said other position to its said one position, with the support means and tape driven in said opposite direction, said projection of said movable element being disposed adjacent said one end of said groove with the tape occupying its said starting position relative to said recording and playback means.

2. The device of claim 1, wherein, progressing along said groove from its said one end, the groove has a first elongated portion following a course disposed at an angle to a radial plane passing through the drum joining with a second elongated portion occupying such a radial plane, said first portion being oriented whereby with movement of the tape support means in said one direction, said projection moves along the groove in a fashion producing movement of said movable element toward its said one position.

3. The device of claim 2, wherein said bias mechanism is operatively connected to said movable element and has an over-center position relative to said motor means through which it moves from one side to the other thereof with movement of said movable element toward its said first position, and said second elongated portion of said groove includes a wall expanse engageable with said projection during movement of said tape support means in said one direction, said wall expanse being effective, through engagement with said projection, to hold said bias mechanism short of said over-center position and on said one side thereof.

4. The device of claim 3, wherein said adjusting mechanism further includes toggle actuator means operable, with said projection engaging said wall expanse, and on said drum occupying a certain angular disposition about its axis, to move said movable element into its said first position, thus to shift said bias mechanism through its said over-center position.

5. The device of claim 4, wherein said toggle actuator means comprises a cam joined to said movable element effective, when engaged on one side thereof, to shift the movable element toward its said first position, a member spaced from said cam shiftable to engage said one side of said cam, and means operatively interposed between said drum and member responsive to the angular disposition of the drum, and operable to shift the member against said one side of said cam on said drum occupying said certain angular disposition.

References Cited

UNITED STATES PATENTS

| | | | |
|---|---|---|---|
| 2,668,059 | 2/1954 | Roberts | 274—4(D) |
| 2,951,653 | 9/1960 | Haenel | 242—191X |
| 3,008,012 | 11/1961 | Proctor | 274—4(C)UX |
| 3,471,104 | 11/1969 | Wakabayashi | 242—201 |

LEONARD FORMAN, Primary Examiner

D. A. DEARING, Assistant Examiner

U.S. Cl. X.R.

274—4A; 22—201

UNITED STATES PATENT OFFICE
CERTIFICATE OF CORRECTION

Patent No. 3,606,345 Dated September 20, 1971

Inventor(s) James F. Cranor et al.

It is certified that error appears in the above-identified patent and that said Letters Patent are hereby corrected as shown below:

Column 14, lines 65 and 66, "wherein said bias mechanism is operatively connected to said movable element and has" should read -- which further includes a bias mechanism operatively connecting said movable element and said motor means and having --.

Signed and sealed this 1st day of August 1972.

(SEAL)
Attest:

EDWARD M.FLETCHER,JR.
Attesting Officer

ROBERT GOTTSCHALK
Commissioner of Patents

M PO-1050 (10-69)

USCOMM-DC 60376-P69
☆ U.S. GOVERNMENT PRINTING OFFICE : 1969 O—366-334.